US011552377B2

(12) United States Patent
Urano et al.

(10) Patent No.: US 11,552,377 B2
(45) Date of Patent: Jan. 10, 2023

(54) RECTANGULAR SECONDARY BATTERY

(71) Applicant: HITACHI AUTOMOTIVE SYSTEMS, LTD., Ibaraki (JP)

(72) Inventors: Kazuaki Urano, Ibaraki (JP); Masaaki Iwasa, Ibaraki (JP); Takuro Tsunaki, Ibaraki (JP); Sho Matsumoto, Ibaraki (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 769 days.

(21) Appl. No.: 14/437,396

(22) PCT Filed: Nov. 26, 2012

(86) PCT No.: PCT/JP2012/080473
§ 371 (c)(1),
(2) Date: Apr. 21, 2015

(87) PCT Pub. No.: WO2014/080518
PCT Pub. Date: May 30, 2014

(65) Prior Publication Data
US 2015/0295221 A1 Oct. 15, 2015

(51) Int. Cl.
*H01M 50/578* (2021.01)
*H01M 10/04* (2006.01)
(Continued)

(52) U.S. Cl.
CPC ......... *H01M 50/578* (2021.01); *H01M 4/70* (2013.01); *H01M 10/0431* (2013.01);
(Continued)

(58) Field of Classification Search
CPC ........ H01M 2/345; H01M 2/043; H01M 2/22; H01M 2/263; H01M 2/30; H01M 10/0431
See application file for complete search history.

(56) References Cited

U.S. PATENT DOCUMENTS

| 5,705,290 A | 1/1998 | Azema |
| 5,766,790 A | 6/1998 | Kameishi et al. |

(Continued)

FOREIGN PATENT DOCUMENTS

| CN | 201266648 Y | 7/2009 |
| EP | 2 903 056 A1 | 8/2015 |

(Continued)

OTHER PUBLICATIONS

Chinese Office Action dated Apr. 1, 2017 in the Chinese Application No. 201280076626.X.

*Primary Examiner* — Ula C Ruddock
*Assistant Examiner* — Thomas H. Parsons
(74) *Attorney, Agent, or Firm* — Volpe Koenig

(57) ABSTRACT

Provided is a rectangular secondary battery with improved rigidity against vibrations and impacts. A rectangular secondary battery of the present invention includes: a flat-shaped electrode group; a current-collecting plate electrically connected to the electrode group; a battery case accommodating the current-collecting plate and the electrode group; a battery cover that closes an opening of the battery case; an electrode terminal penetrating through the battery cover, the electrode terminal being connected to the
(Continued)

current-collecting plate via a connecting member; and a gasket that is inserted between the electrode terminal and the battery cover for insulating and sealing. An insulator is disposed between the current-collecting plate and the battery cover, the battery cover includes a battery cover side fixing part that fixes the insulator, and the insulator includes a current-collecting plate side fixing part that fixes the current-collecting plate.

6 Claims, 8 Drawing Sheets

(51) Int. Cl.
*H01M 50/147* (2021.01)
*H01M 50/528* (2021.01)
*H01M 50/538* (2021.01)
*H01M 50/543* (2021.01)
*H01M 4/70* (2006.01)
*H01M 10/0587* (2010.01)
*H01M 50/10* (2021.01)
*H01M 50/15* (2021.01)
*H01M 50/172* (2021.01)
*H01M 10/0525* (2010.01)

(52) U.S. Cl.
CPC ....... *H01M 50/147* (2021.01); *H01M 50/528* (2021.01); *H01M 50/538* (2021.01); *H01M 50/543* (2021.01); *H01M 10/0525* (2013.01); *H01M 10/0587* (2013.01); *H01M 50/10* (2021.01); *H01M 50/15* (2021.01); *H01M 50/172* (2021.01); *H01M 2200/20* (2013.01); *H01M 2220/20* (2013.01); *Y02E 60/10* (2013.01)

(56) References Cited

U.S. PATENT DOCUMENTS

| | | | |
|---|---|---|---|
| 7,781,088 B2 * | 8/2010 | Yamauchi | H01M 2/34 429/53 |
| 2008/0038627 A1 | 2/2008 | Yamauchi et al. | |
| 2008/0289945 A1 * | 11/2008 | Brazier | H01M 2/1229 200/83 R |
| 2011/0052949 A1 | 3/2011 | Byun et al. | |
| 2012/0214030 A1 | 8/2012 | Guen | |
| 2013/0071728 A1 | 3/2013 | Shibanuma et al. | |
| 2015/0303443 A1 * | 10/2015 | Yokoyama | H01M 50/578 429/181 |
| 2016/0072119 A1 * | 3/2016 | Umeyama | H01M 2/1241 429/58 |

FOREIGN PATENT DOCUMENTS

| | | | |
|---|---|---|---|
| JP | 07-014558 U | | 3/1995 |
| JP | 07-326337 A | | 12/1995 |
| JP | 08-293301 A | | 11/1996 |
| JP | 09-055197 A | | 2/1997 |
| JP | 2870152 B2 | | 1/1999 |
| JP | 2008-066254 A | | 3/2008 |
| JP | 2011-054561 A | | 3/2011 |
| JP | 2011-233399 A | | 11/2011 |
| JP | 2012-119183 A | | 6/2012 |
| JP | 2012119183 | * | 6/2012 |
| JP | 2012-174683 A | | 9/2012 |
| WO | 2011/135906 A1 | | 11/2011 |

\* cited by examiner

Cross-sectional view A-A

RECTANGULAR SECONDARY BATTERY

TECHNICAL FIELD

The present invention relates to rectangular secondary batteries to be mounted on vehicles for use, for example.

BACKGROUND ART

Conventionally hermetically-sealed lithium-ion secondary batteries mounted on a vehicle or other devices may have gas accumulated inside of the battery due to overcharge, excessively rising temperatures, breakages by external force and the like, so that the pressure inside of the battery rises due to such gas in some cases. A battery case of such hermetically-sealed battery then has a fragile portion for safety purposes.

For instance, batteries proposed are configured so that a part of the battery case is made of a material that is deformed in accordance with the internal pressure of the battery, and when such a part is deformed until the fragile part breaks, such breakage of the fragile part interrupts the current path or allows a communication between the inside and the outside of the encapsulated battery to let the gas out.

For instance, Patent Literature 1 has the configuration of including a diaphragm and a current collecting tab to interrupt the current flow that are fixed to insulators in the form of separate members, the insulators being fitted mutually. A part of the current collecting tab leading to the fragile portion is connected to the diaphragm for fixing, and so when the battery internal pressure rises, the diaphragm is deformed and so the fragile portion breaks, whereby the path of current is interrupted.

CITATION LIST

Patent Literature

Patent Literature 1: JP 2008-66254 A

SUMMARY OF INVENTION

Technical Problem

In the technique of Patent Literature 1, however, the current collecting plate is fixed to the battery case through fitting of the insulator integrated with the current collecting plate and the insulator integrated with the cover by caulking, and through welding of the fragile part and the diaphragm, and so vibrations and impacts applied to the current collecting plate may be transmitted to the welding part between the fragile part and the diaphragm and affect there, and may lead to malfunction unfortunately.

Conventionally as described in Patent Literature 1, the connecting shaft of the external connecting terminal is just inserted into the opening hole of the cover, followed by caulking, so as to fix the external connecting terminal to the cover. Then, a gasket is inserted between the cover and the connecting shaft for insulating and sealing, the gasket being compressed under compressive force. That is, vibrations and impacts applied to the current collecting plate may be transmitted to the gasket as a fragile part, and may affect the hermetical-sealing property.

In view of the above problems, the present invention aims to provide a rectangular secondary battery having high resistance to impacts and such resistance to vibrations.

Solution to Problem

In order to solve the aforementioned problems, a rectangular secondary battery of the present invention includes: a flat-shaped electrode group; a current-collecting plate electrically connected to the electrode group; a battery case accommodating the current-collecting plate and the electrode group; a battery cover that closes an opening of the battery case; an electrode terminal disposed at the battery cover, the electrode terminal being connected to the current-collecting plate via a connecting member; and a gasket that is inserted between the electrode terminal and the battery cover for insulating and sealing. An insulator is disposed between the current-collecting plate and the battery cover, the battery cover includes a battery cover side fixing part that engages with the insulator, and the insulator includes a current-collecting plate side fixing part that fixes the current-collecting plate.

The present invention is configured so that the insulator is engaged with the battery cover via the battery cover side fixing part, the current-collecting plate is fixed via the current-collecting plate side fixing part provided at the insulator, and the current-collecting plate is fixed to the battery cover via the insulator. If vibrations and impacts are applied to the current-collecting plate, this configuration can prevent such vibrations and impacts from being transmitted from the current-collecting plate to the battery cover via the insulator, and such vibrations and impacts from being applied to the gasket as a fragile portion. In this way, hermetical-sealing property of the gasket can be kept.

Advantageous Effects of Invention

The present invention can provide a rectangular secondary battery having high resistance to impacts and vibrations. Problems, configurations, and advantageous effects other than those described above will be made clear by the following description of embodiments.

DESCRIPTION OF EMBODIMENTS

The following describes embodiments of the present invention, with reference to the drawings. The following exemplifies a rectangular lithium-ion secondary battery to be mounted on a vehicle such as an electric vehicle or a hybrid vehicle as examples of the rectangular secondary battery.

Embodiment 1

Figure 1:
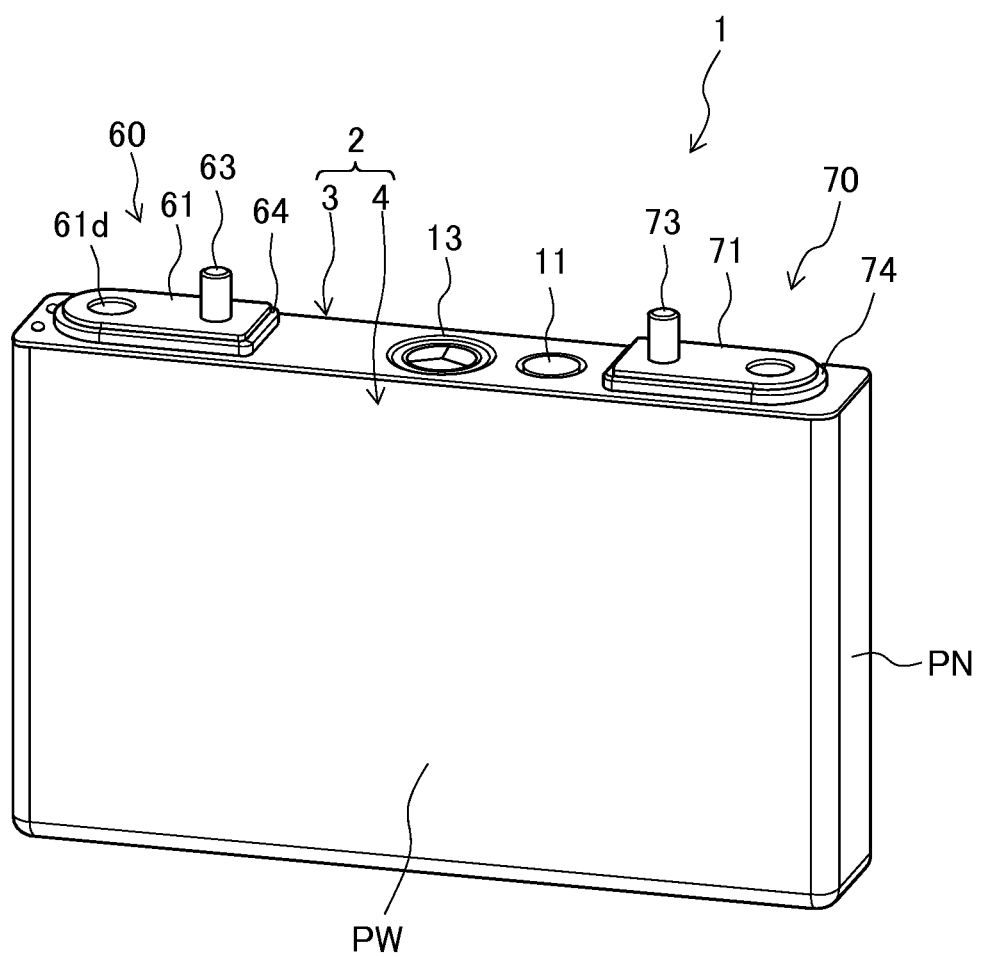
FIG. 1 is an external perspective view of a rectangular secondary battery according to Embodiment 1.
Figure 2:
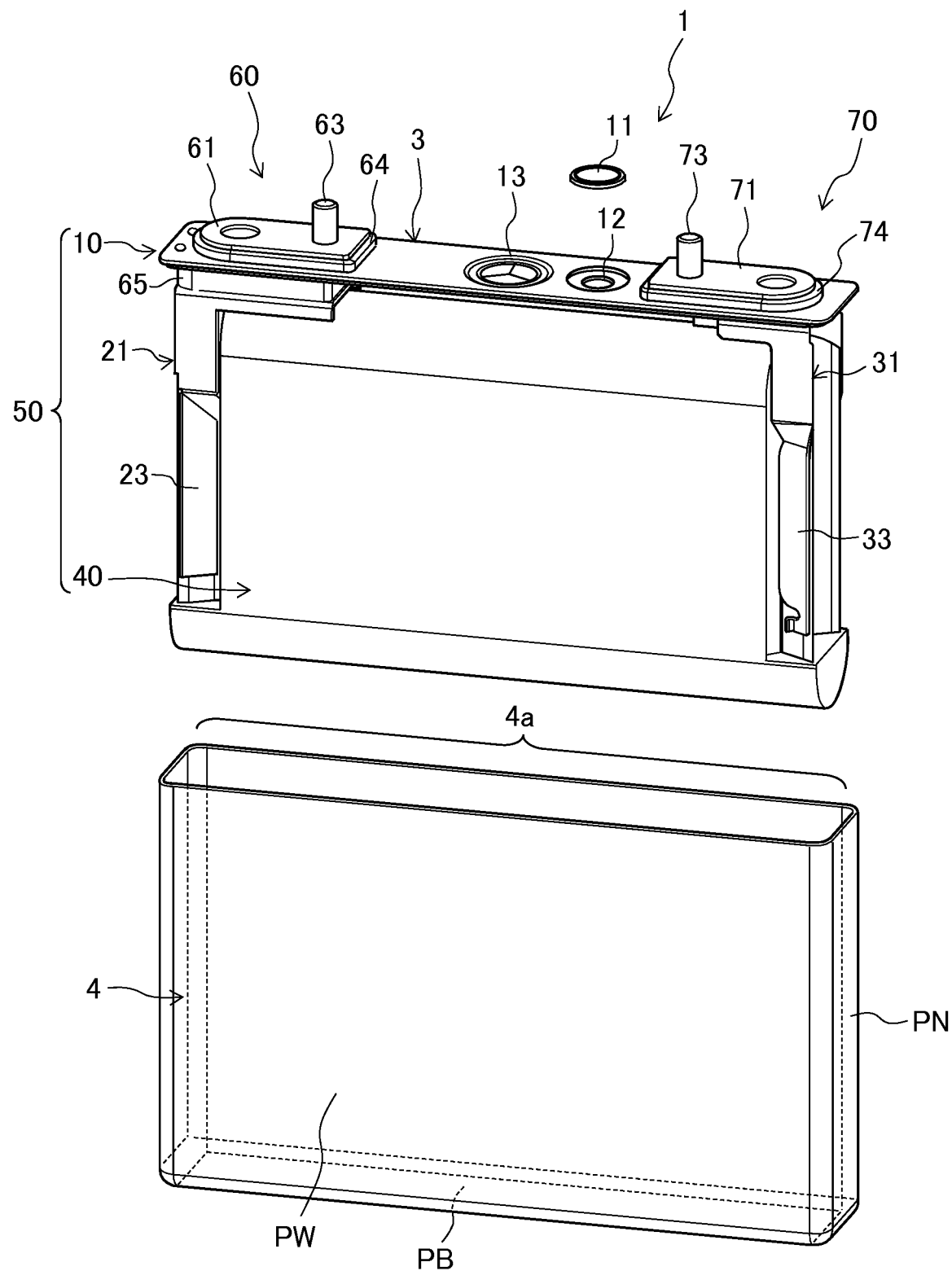
FIG. 2 is an exploded perspective view of the rectangular secondary battery, from which the battery case is removed.

FIG. 1 is an external perspective view of a lithium-ion secondary battery according to the present embodiment, and FIG. 2 is an exploded perspective view of the lithium-ion secondary battery in FIG. 1.

As illustrated in FIG. 1 and FIG. 2, the lithium-ion secondary battery 1 includes a battery container 2 having a rectangular deep-drawing shaped battery case 4 and a battery cover 3 to seal an opening 4a of the battery case 4, and electrical-power generative elements accommodated in the battery container. The electrical-power generative elements include an electrode group 40 that is prepared by overlaying separators 43, 44 between a positive electrode 41 and a negative electrode 42, which is then wound to be a flat shape. The electrode group 40, together with a positive electrode current-collecting plate 21 and a negative electrode current-collecting plate 31, is then covered with an insulating sheet (not illustrated) at the outside, which is inserted into the battery case 4.

The battery case 4 and the battery cover 3 are both made of aluminum alloy, and the battery cover 3 is joined to the battery case 4 by laser welding to seal the opening 4a. The battery cover 3 is provided with a positive-electrode side terminal configuration unit 60 and a negative-electrode side terminal configuration unit 70, thus configuring a cover assembly 10.

The positive-electrode side terminal configuration unit 60 and the negative-electrode side terminal configuration unit 70 have a positive-electrode terminal 61 and a negative-electrode terminal 71 (a pair of electrode terminals) that are disposed on the battery cover 3 via first insulators 64 and 74. The battery cover 3 is provided with, in addition to the positive-electrode terminal 61 and the negative-electrode terminal 71, a gas exhaust valve 13 that opens to exhaust gas inside the battery container 2 if the pressure in the battery container 2 rises above a predetermined value, a filling port 12 to let electrolyte into the battery container 2, and a plug 11 to seal the filling port 12 after filling with the electrolyte. The plug 11 in the state of closing the filling port 12 is joined to the battery cover 3 by laser welding, thus sealing the filling port 12.

The positive-electrode terminal 61 and the negative-electrode terminal 71 are disposed on the outside of the rectangular battery cover 3 and at positions away from each other on one side and on the other side in the direction along the long side. The positive-electrode terminal 61 and the negative-electrode terminal 71 hold terminal bolts 63 and 73 to fix a bus bar connecting terminal, and are disposed at the inside of the battery cover 3 as well to be conductive-connected to the positive-electrode and negative-electrode current-collecting plates 21 and 31. The positive-electrode terminal 61 is made of aluminum or aluminum alloy, and the negative-electrode terminal 71 is made of copper alloy.

The positive-electrode terminal 61 is placed on the battery cover 3 via a gasket 66 (see FIG. 4) and a first insulator 64 on the outside of the battery cover 3 and via a second insulator 65 on the inside of the battery cover 3, so that the positive-electrode terminal is electrically insulated from the battery cover 3. The positive-electrode terminal 61, together with the positive electrode current-collecting plate 21, is fixed to the battery cover 3 by caulking a shaft part 61e. The positive-electrode terminal 61 is electrically connected with the positive electrode current-collecting plate 21 via a current interruption means. This current interruption means serves as a connecting member to connect the positive electrode current-collecting plate 21 and the positive-electrode terminal 61 as well. The configuration of the current interruption means is described later in details.

The negative-electrode terminal 71 is placed on the battery cover 3 via a gasket (not illustrated) and a first insulator 74 on the outside of the battery cover 3 and via a second insulator (not illustrated) on the inside of the battery cover 3, so that the negative-electrode terminal 71 is electrically insulated from the battery cover 3. The negative-electrode terminal 71 (electrode terminal) includes a flat-shaped main body part (negative external terminal) 71a disposed on the outside of the battery cover 3 and a shaft part (not illustrated) that protrudes from the main body part 71a so as to penetrate through the battery cover 3. The shaft part of the negative terminal 71 penetrates through the battery cover 3 and the negative current-collecting plate 31 to protrude therefrom, and the negative-electrode terminal 71 is electrically connected to the negative electrode current-collecting plate 31 by caulking the shaft part at the forward end, and is fixed to the battery cover 3 together with the negative electrode current-collecting plate 31 integrally.

The positive electrode current-collecting plate 21 and the negative electrode current-collecting plate 31 have a pair of flat joint pieces 23 and 33 that are elongated toward the bottom of the battery case 4 to be conductive-connected to the wound electrode group 40. These joint pieces 23 and 33 are joined by welding to the positive electrode and the negative electrode that are provided at both end parts in the winding axis direction of the wound electrode group 40. Welding may be performed by methods such as ultrasonic welding, resistance welding and laser welding.

The wound electrode group 40 is disposed between the joint piece 23 of the positive electrode current-collecting plate 21 and the joint piece 33 of the negative electrode current-collecting plate 31 so that their both ends are supported. The cover assembly 10 and the electrode group 40 make up an electrical-power generative elements assembly 50.

Figure 3:
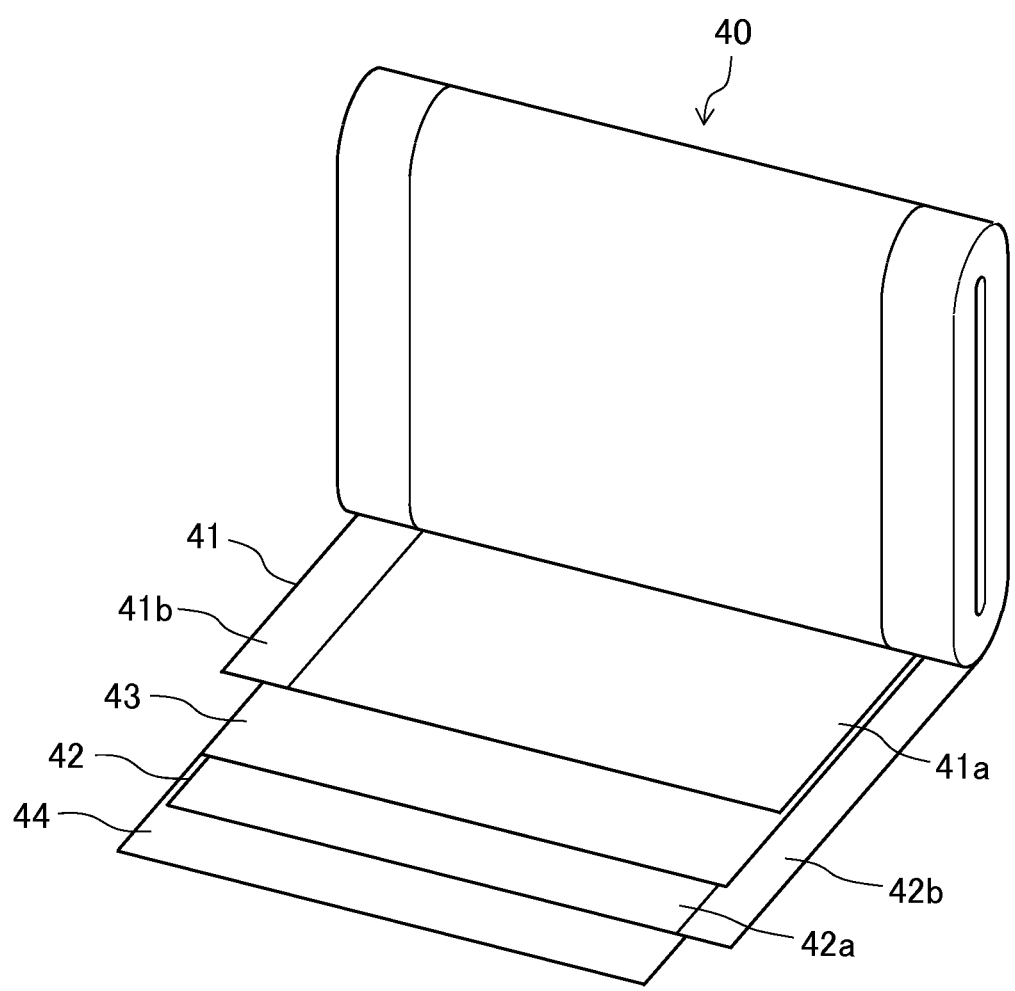
FIG. 3 is an exploded perspective view of a wound electrode group.

FIG. 3 is an external perspective view of the wound electrode group 40 in FIG. 2 in details, illustrating the state where the winding-end side is opened.

The wound electrode group 40 is configured by placing the negative electrode 42 and the positive electrode 41 between the first and the second separators 43 and 44 and winding them to be a flat shape. As illustrated in FIG. 3, the outermost electrode of the wound electrode group 40 is the negative electrode 42, on the outside of which the separator 44 is further wound.

The separators 43 and 44 have a function of insulating the positive electrode 41 and the negative electrode 42. The negative electrode 42 has a negative-electrode coated part 42a and the positive electrode 41 has a positive-electrode coated part 41a, where the negative-electrode coated part 42a is larger than the positive-electrode coated part 41a in width, whereby the positive-electrode coated part 41a is always covered by the negative-electrode coated part 42a.

A positive-electrode uncoated part 41b and a negative-electrode uncoated part 42b are bundled at their flat parts, which is then connected to the current-collecting plates 21 and 31 of both electrodes leading to the positive terminal 61 and the negative-electrode terminal 71 by welding or the like. Herein although the separators 43 and 44 are wider than the negative-electrode coated part 42a in width direction, they are wound at the positions of the positive-electrode uncoated part 41b and the negative-electrode uncoated part 42b where metal foil faces are exposed, and so do not interfere with the process of bundling and welding.

The positive electrode 41 has the positive-electrode coated part 41a, where positive-electrode active material mix is applied on both faces of positive electrode foil as the positive current-collecting member, and has the positive-electrode uncoated part (foil exposed part) 41b at an end part on one side of the width direction of the positive electrode foil where the positive-electrode active material mix is not applied.

The negative electrode 42 has the negative-electrode coated part 42a where negative-electrode active material mix is applied on both faces of the negative electrode foil as the negative-electrode current collecting member, and has the negative-electrode uncoated part (foil exposed part) 42b at an end part on the other side of the width direction of the positive electrode foil where the negative-electrode active material mix is not applied. The positive-electrode uncoated part 41b and the negative-electrode uncoated part 42b are regions where metal faces of the electrode foil are exposed, and as illustrated in FIG. 3, they are disposed on one side and the other side of the winding axis direction.

For the negative electrode 42, 10 parts by weight of polyvinylidene fluoride (hereinafter called PVDF) as a binder is added to 100 parts by weight of amorphous carbon powder as the negative-electrode active material, to which N-methylpyrrolidone (hereinafter called NMP) is added as a dispersion medium, which is then kneaded, thus preparing the negative-electrode active material mix. This negative-electrode active material mix is applied to both faces of copper foil (negative electrode foil) of 10 μm in thickness while leaving the current-collecting part (negative electrode uncoated part). The resultant then undergoes drying, press-working and cutting so as to prepare a negative electrode of 70 μm in thickness at the negative-electrode active material coated part not including copper foil.

The present embodiment describes the case of including amorphous carbon as the negative-electrode active material, which is not a limiting example. Carbonaceous materials such as natural graphite, artificial various types of graphite materials, and cokes may be used, as long as lithium ions can be inserted and separated, whose particle shapes also are not limited especially, including scale-like, spherical, fibrous, and massive forms.

The positive electrode 41 is prepared by adding 10 parts by weight of scale-like graphite as a conductive material and 10 parts by weight of PVDF as a binder to 100 parts by weight of lithium manganate (chemical formula: $LiMn_2O_4$) as a positive-electrode active material, to which NMP is added as a dispersion medium, followed by kneading to prepare a positive-electrode active material mix. This positive-electrode active material mix is applied to both faces of aluminum foil (positive electrode foil) of 20 μm in thickness while leaving the non-coated current-collecting part (positive electrode uncoated part). The resultant then undergoes drying, press-working and cutting so as to prepare a positive electrode of 90 μm in thickness at the positive-electrode active material coated part not including aluminum foil.

The present embodiment describes the case of including lithium manganate as the positive-electrode active material, which is not a limiting example. Other types of lithium manganate having a spinel crystal structure, a lithium-manganese composite oxide partially substituted by or doped with a metal element, lithium cobaltate or lithium titanate having a layered crystal structure, or a lithium-metal compound oxide prepared by substituting a part of these oxides by or doping a part thereof with a metal element may be used.

The present embodiment describes the case of including PVDF as a binder for the coated parts of the positive electrode and the negative electrode, which may be polymers such as polytetrafluoroethylene (PTFE), polyethylene, polystyrene, polybutadiene, butyl rubber, nitrile rubber, styrene-butadiene rubber, polysulfide rubber, nitrocellulose, cyanoethylcellulose, various kinds of latex, acrylonitrile, vinyl fluoride, vinylidene fluoride, propylene fluoride, chloroprene fluoride, and acrylic resin, or a mixture of them.

Through the filling port 12 disposed at the battery cover 3, non-aqueous electrolyte solution is injected. The non-aqueous electrolyte solution may be prepared by dissolving 1 mol/liter of lithium hexafluorophosphate ($LiPF_6$) in a solution containing the mixture where ethylene carbonate and dimethyl carbonate are mixed at a volume ratio of 1:2. After injecting the electrolyte solution, the plug 11 is fitted to the filling port 12 for closing, which is then sealed by laser welding.

Figure 4:
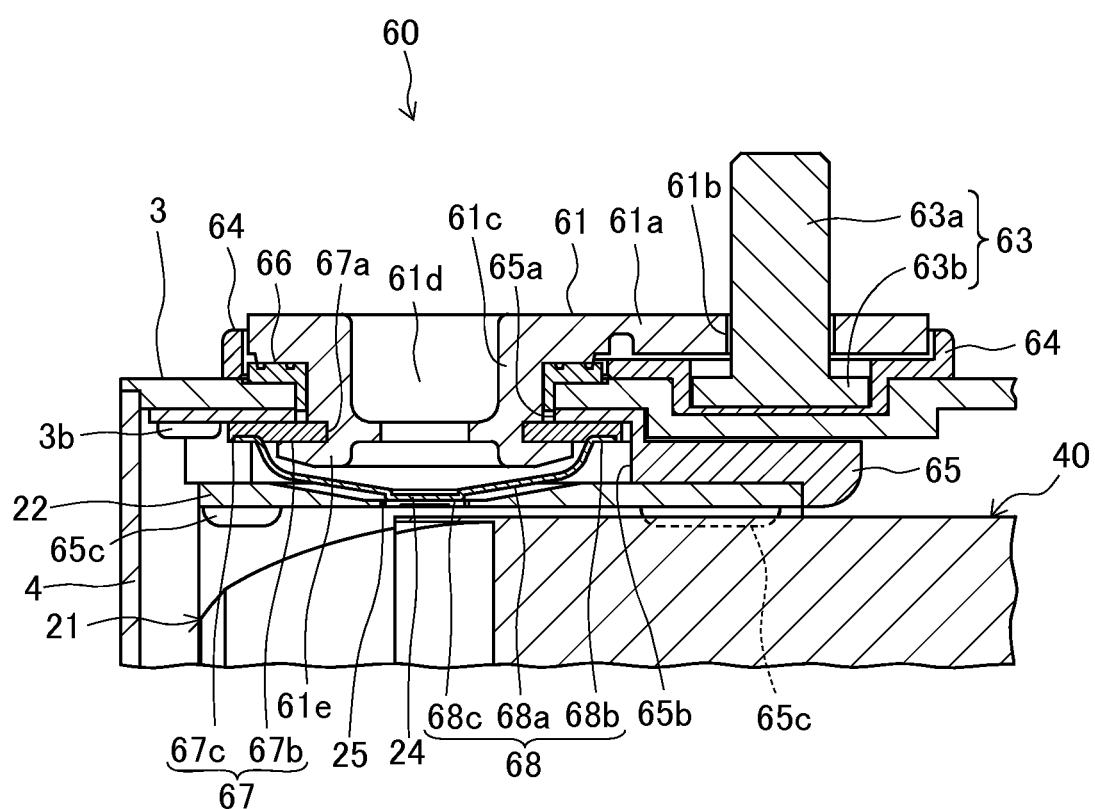
FIG. 4 is a cross-sectional view to describe the configuration of a positive-electrode terminal configuration unit.
Figure 5:
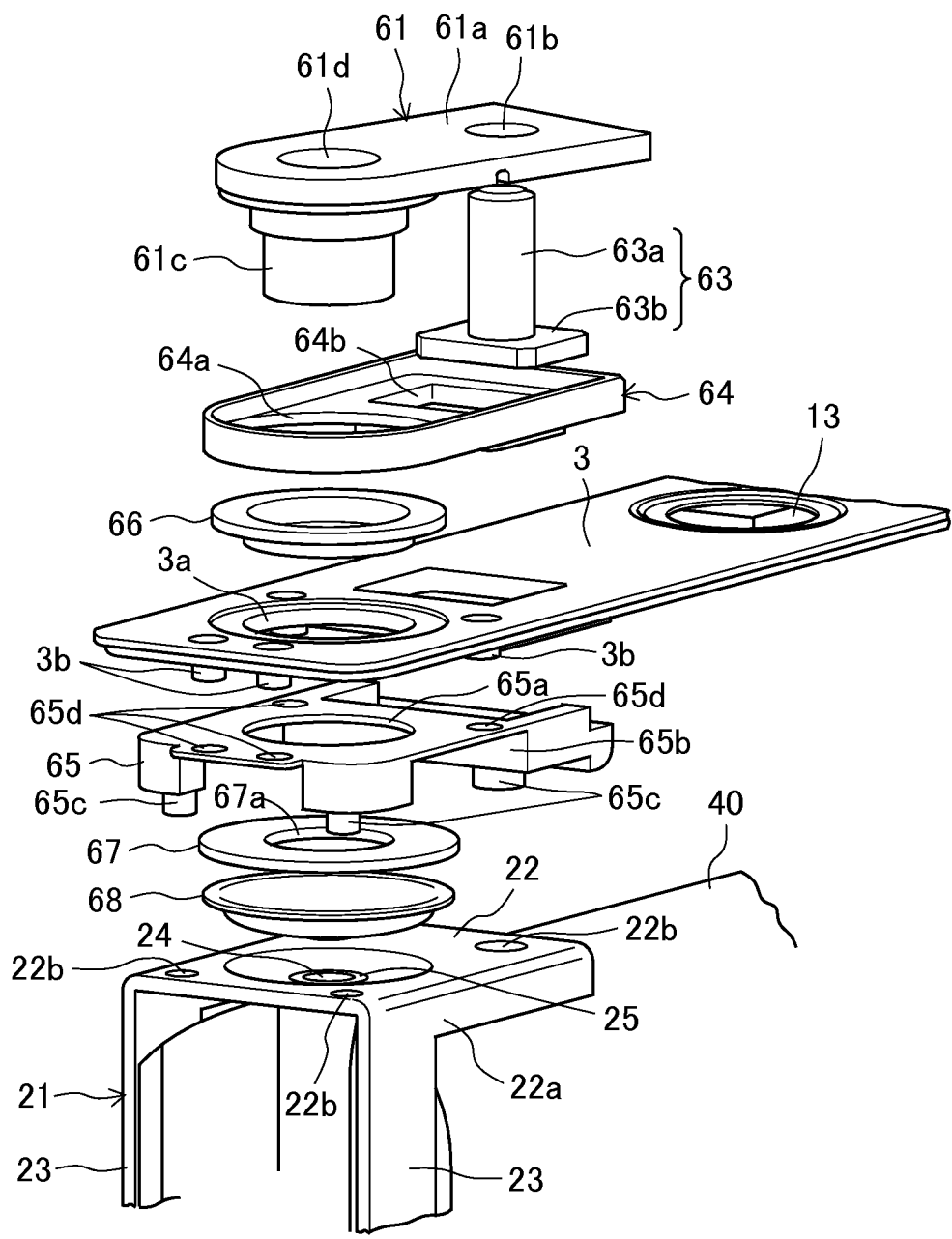
FIG. 5 is an exploded perspective view of the components of FIG. 4.
Figure 6:
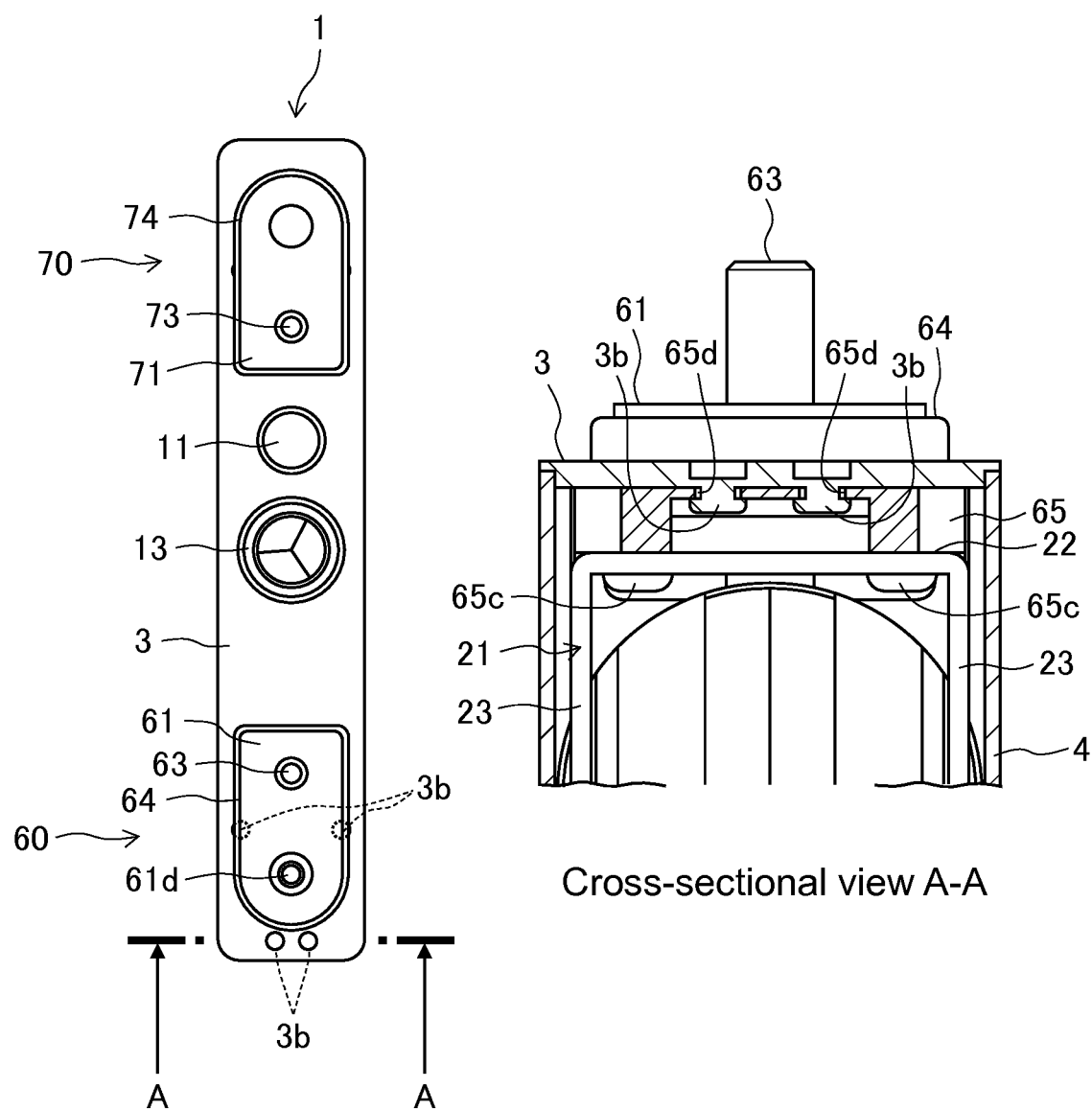
FIG. 6 is a cross-sectional view to describe the configuration of a battery cover side fixing part and a current-collecting plate side fixing part.

FIG. 4 is a cross-sectional view to describe the configuration of the positive-electrode terminal configuration unit, FIG. 5 is an exploded perspective view of their components, and FIG. 6 is a cross-sectional view to describe the configuration of a battery cover side fixing part and a current-collecting plate side fixing part.

The positive-electrode side terminal configuration unit 60 has current interruption means to interrupt current in response to rise in the internal pressure of the battery. The current interruption means is disposed along the current path from the positive terminal 61 to the positive-electrode current-collecting plate 21.

As illustrated in FIG. 4 and FIG. 5, the positive-electrode side terminal configuration unit 60 includes the positive terminal 61, the positive-electrode terminal bolt 63, the first insulator 64, the gasket 66, the second insulator 65, a positive-electrode connection electrode 67, a conductive plate 68 that is deformed in response to rise in internal pressure of the battery and the positive electrode current-collecting plate 21.

The positive terminal 61, the first insulator 64, the gasket 66, the second insulator 65, and the positive-electrode connection electrode 67 are integrally fixed by caulking to the battery cover 3 by caulking the tip end of the shaft part 61c of the positive terminal 61. Then, the conductive plate 68 is welded to the positive-electrode connection electrode 67 for joining, and the positive electrode current-collecting plate 21 is welded to the conductive plate 68 for joining.

The conductive plate 68 has a dome-shape that protrudes toward the inside of the battery, and is deformed in the direction so that the height of the top part is lowered as the internal pressure of the battery increases, so as to bias a joint part 24 of the positive electrode current-collecting plate 21 toward the outside of the battery (upward in FIG. 4) that is the direction orthogonal to the base 22 until the fragile part 25 breaks to let the joint part 24 away from the base 22 and interrupt electrical connection with the positive electrode current-collecting plate 21.

The positive electrode current-collecting plate 21 is fixed to the battery cover 3 via the second insulator 65. The battery cover 3 is provided with an engagement part (battery cover side fixing part) to let the second insulator 65 engage with the battery cover 3.

The battery cover 3 and the second insulator 65 are mutually fixed via protrusions (battery cover side fixing part) 3b, and the second insulator 65 and the positive electrode current-collecting plate 21 are mutually fixed via protrusions (current-collecting plate side fixing part) 65c, so that the battery cover 3, the second insulator 65 and the positive electrode current-collecting plate 21 are integrated.

The following describes the configuration of the positive-electrode side terminal configuration unit 60 in the present embodiment in details.

The positive terminal 61 (electrode terminal) includes a flat part 61a (external terminal) disposed along the upper face on the outside of the battery cover 3, a bolt insertion bore 61b that opens at the flat part 61a and supports the positive-electrode terminal bolt 63 inserted therein, and the shaft part (connecting shaft) 61c that is inserted into an opening 3a of the battery cover 3 to penetrate through the battery cover 3 and protrude to the inside of the battery cover 3, and the shaft part 61c has a through-hole 61d bored therein that penetrates the center of the shaft part in the axial direction.

The positive-electrode terminal bolt 63 has a shaft part 63a that is to be inserted into the bolt insertion bore 61b of the positive terminal 61, and a head part (flat bottom part) 63b that is inserted and supported between the flat part 61a and the first insulator 64.

The first insulator 64 includes an insulating plate-form member that is inserted between the flat part 61a of the positive-electrode terminal 61 and the upper face of the battery cover 3, which has an opening 64a (see FIG. 5) that communicates with the opening 3a of the battery cover 3 and is for insertion of the shaft part 61c of the positive-electrode terminal 61.

The gasket 66 has a ring shape that is of a L-shape in cross section, and is externally fitted to the shaft part 61c of the positive-electrode terminal 61, and is inserted into the opening 3a of the battery cover 3 so as to make up a terminal sealing part that establishes insulation between the shaft part 61c of the positive-electrode terminal 61 and the battery cover 3 and seals there. The gasket 66 is inserted between the flat part 61a of the positive-electrode terminal 61 and the battery cover 3 while being compressed under predetermined compressive force by caulking the shaft part 61c of the positive-electrode terminal 61.

The positive-electrode connection electrode 67 includes a conductive circle flat member that is disposed on the inside of the battery cover 3, at a center of which an opening 67a that communicates with the opening 3a of the battery cover 3 is provided for insertion of the shaft part 61c of the positive-electrode terminal 61. The positive-electrode connection electrode 67 is disposed along the lower face of the battery cover 3 while sandwiching the second insulator 65 between it and the battery cover 3, where the opening 67a is open at the flat lower face 67b. The positive-electrode connection electrode 67 is then fixed to the battery cover 3 integrally while being electrically connected to the positive terminal 61 and electrically insulated from the battery cover 3 by caulking the forward end of the shaft part 61c of the positive-electrode terminal 61 that protrudes from the opening 67a outwardly in the radial direction. Toward the lower face 67b of the positive-electrode connection electrode 67, the caulking part 61e of the shaft part 61c of the positive-electrode terminal 61 protrudes, and the through-hole 61d that communicates with the outside of the battery is open toward the inside of the battery.

The second insulator 65 includes an insulating plate member made of a synthetic resin material that is disposed along the lower face of the battery cover 3, and is inserted between the battery cover 3 and the positive-electrode connection electrode 67 and between the battery cover 3 and the positive electrode current-collecting plate 21 for electrical insulation therebetween. The second insulator 65 has a predetermined thickness, and has a through-hole 65a that communicates with the opening 3a of the battery cover 3 and is for insertion of the shaft part 61c of the positive-electrode terminal 61. The second insulator 65 has a part that is inserted between the positive-electrode connection electrode 67 and the battery cover 3, and is fixed by caulking integrally to the battery cover 3 together with the positive-electrode connection electrode 67 by caulking the forward end of the shaft part 61c of the positive-electrode terminal 61.

Then the second insulator 65 is provided with a recess 65b that communicates with the through-hole 65a, in which the positive-electrode connection electrode 67 and the conductive plate 68 are to be accommodated. The recess 65b is provided like a recess at the lower face of the second insulator 65, and communicates with another space inside of the battery.

As illustrated in FIG. 5, the second insulator 65 is provided with a plurality of fixing bores 65d at the upper face to fix the second insulator 65 to the battery cover 3, whereas the battery cover 3 is provided with protrusions 3b at the lower face of the battery cover 3 and at positions corresponding to the fixing bores 65d, the protrusions 3b being to be inserted into the fixing bores 65d. The protrusions 3b of the battery cover 3 are inserted into the fixing bores 65d until the upper face of the second insulator 65 abuts with the lower face of the battery cover 3, and then the forward ends of the protrusions 3b protruding from the fixing bores 65d are deformed under pressure to be expanded in diameter, whereby the second insulator 65 is engaged with the battery cover 3 by caulking (see FIG. 6) (engagement part). The protrusions 3b of the battery cover 3 are prepared beforehand by forming recesses on the outside of the battery by press-working and forming protrusions accordingly on the inside of the battery.

The second insulator 65 is provided with a plurality of protrusions 65c at the lower face to fix the positive electrode current-collecting plate 21 a (see FIG. 4 and FIG. 5). The plurality of protrusions 65c are inserted into a plurality of supporting holes 22b provided at the base 22 of the positive electrode current-collecting plate 21, respectively, and the forward ends protruding from the supporting holes 22b are deformed by heating to be expanded in diameter for caulking, thus engaging the positive electrode current-collecting plate 21 with the second insulator 65. When the plurality of protrusions 65c are heated, the positive electrode current-collecting plate 21 also is heated for thermal welding of the base 22 to the second insulator 65. In this way, the positive electrode current-collecting plate 21 is fixed integrally with the second insulator 65.

The conductive plate 68 has a dome-shaped diaphragm part 68a whose diameter decreases gradually along the axial direction, and a ring-shaped flange part 68b that is expanded from the outer rim part of the diaphragm part 68a to the radially outside. Then the diaphragm part 68a is opposed to and covers the opening end of the through-hole 65a that is open at the lower face 67b of the positive-electrode connection electrode 67, and the flange part 68b is joined to the lower face 67b of the positive-electrode connection electrode 67 for hermetically sealing to divide the space outside of the battery that communicates with the through-hole 61d and the space inside of the battery.

The outer rim part of the diaphragm part 68a is provided with the flange part 68b for joining with the lower face 67b of the positive-electrode connection electrode 67. The flange part 68b is expanded toward the radially outside along one plane, and has a ring shape having a constant width along the entire circumference and abutting the lower face of the positive-electrode connection electrode 67. The flange part is joined with the lower face 67b of the positive-electrode connection electrode 67 by laser welding continuously along the entire circumference for hermetically sealing.

The diaphragm part 68a is made of a material and has a thickness, a cross-sectional shape and the like, which are set so that, when the internal pressure of the battery container 2 rises above a predetermined upper limit, it is deformed in the direction to lower the height in accordance with a difference in pressure from the outside of the battery container 2 to break the fragile part 25 of the positive electrode current-collecting plate 21, and keep the joint part 24 at a position away from the positive electrode current-collecting plate 21 due to plastic deformation even after the internal pressure decreases. The diaphragm part 68a has a center part 68c at the top thereof, which is joined with the joint part 24 of the positive electrode current-collecting plate 21 by laser welding. The joining of the center part 68c may be performed by resistance welding or ultrasonic welding as well as laser welding.

The diaphragm part 68a is configured so that it continues from the flange part 68b and its diameter decreases gradually toward the direction away from the lower face 67b of the positive-electrode connection electrode 67 along the axial direction. The diaphragm part has a three-dimensional shape including a first inclined-face part whose cross section has a linear shape and a second inclined-face part that continues from the first inclined-face part and is bent so as to be extended at the inclination angle different from that of the first inclined-face part, whose cross section has a linear shape, where the first inclined-face part and the second inclined-face part are aligned in the axial direction for combination. As the internal pressure of the battery increases, the diaphragm part 68a is deformed so that the first inclined-face part moves in the direction of increasing the diameter and the second inclined-face part moves to lower the height of the center part 68c. The first inclined-face part has the inclination angle that is smaller than 45° with reference of the axial direction of the diaphragm part 68a, and the second inclined-face part has the inclination angle that is larger than 180° with reference to the first inclined-face part.

As illustrated in FIG. 5, the positive electrode current-collecting plate 21 has the flat base (flat upper-face part) 22 that is opposed to the lower face of the battery cover 3 and is extended in parallel thereto, in which a plurality of supporting holes 22b are disposed at predetermined intervals therebetween, for example, at four corners.

Into these plurality of supporting holes 22b, the plurality of protrusions 65c that are provided at the lower face of the second insulator 65 are inserted and caulked, whereby the positive electrode current-collecting plate 21 is fixed by caulking to the second insulator 65 integrally.

The base 22 has a pair of edges 22a that are along a pair of side faces and formed by bending in the direction away from the battery cover 3, so as to improve the rigidity to keep the flat shape. The pair of joint pieces 23 of the positive electrode current-collecting plate 21 is provided so as to protrude continuously toward these edges 22a.

The positive electrode current-collecting plate 21 is provided with the joint part 24 that is joined with the center part 68c of the conductive plate 68. The joint part 24 is made up of a thin-wall part that is a part of the base 22 whose thickness is made thinner. The fragile part 25 is configured so as to provide a groove part at the thin-wall part so as to surround the joint part 24, and when the internal pressure of the battery rises, the fragile part 25 breaks due to the conductive plate 68 that is deformed outwardly of the battery so as to separate the joint part 24 from the base 22.

The fragile part 25 has its dimensional shape or the like so as to break when the conductive plate 68 is deformed due to rise in the internal pressure of the battery container 2 and the force pulling toward the battery cover 3 acts thereon, whereas so as not to break under the normal operating environment, such as vibrations during traveling. The center part 68c of the conductive plate 68 and the joint part 24 of the positive electrode current-collecting plate 21 are joined by laser welding, which may be performed by resistance welding or ultrasonic welding.

In the thus configured current interruption means, when the internal pressure of the battery container 2 rises above a predetermined upper limit, the conductive plate 68 is deformed in the direction of lowering the height of the protrusion in accordance with a difference in pressure from the outside of the battery container 2, thus pulling the joint part 24 surrounded with the fragile part 25 of the positive electrode current-collecting plate 21 in the direction orthogonal to the base 22 until the fragile part 25 of the positive electrode current-collecting plate 21 breaks, and separating the joint part 24 from the base 22 to interrupt the current path between the positive-electrode terminal 61 and the positive electrode current-collecting plate 21.

Next, the following describes the method to manufacture the thus configured positive-electrode side terminal configuration unit 60.

(1) Joining of the positive-electrode terminal 61, the first insulator 64, the second insulator 65 and the like with the battery cover 3

Firstly on the battery outside of the battery cover 3, the first insulator 64 and the gasket 66 are positioned with reference to the opening 3a of the battery cover 3 for disposition. Then, the head part 63b of the positive-electrode terminal bolt 63 is inserted into a recess 64b provided at the first insulator 64, and the shaft part 63a of the positive-electrode terminal bolt 63 is inserted into the bolt insertion bore 61b of the positive-electrode terminal 61.

Then on the battery inside of the battery cover 3, the second insulator 65 is inserted between the battery cover 3 and the positive-electrode connection electrode 67 to be overlaid, and the second insulator 65 and the positive-electrode connection electrode 67 are disposed so that the through-hole 65a of the second insulator 65 and the opening 67a of the positive-electrode connection electrode 67 are disposed concentrically. Then the protrusions 3b of the battery cover 3 are inserted into the fixing bores 65d of the second insulator 65 until the forward ends of the protrusions 3b are allowed to protrude from the fixing bores 65d.

Then, the positive-electrode terminal 61 is brought closer from the battery outside of the battery cover 3 until the flat part 61a of the positive-electrode terminal 61 is overlaid on the first insulator 64, and the shaft part 61c of the positive-electrode terminal 61 is inserted into the opening 64a of the first insulator 64, the gasket 66, the opening 3a of the battery cover 3, the through-hole 65a of the second insulator 65, and the opening 67a of the positive-electrode connection electrode 67 one by one from the outside of the battery cover 3, followed by caulking of the forward end of the shaft part 61c. The gasket 66 is inserted between the shaft part 61c and the battery cover 3 for electrical insulation and sealing between them.

For the caulking of the shaft part 61c, a caulking punch has the outer diameter larger than the caulking outer diameter. If the lower face 67b of the positive-electrode connection electrode 67 has a projection such as a rib or a protrusion, such a projection interferes with the punch and so causes a failure in caulking, and so the outer diameter of the caulking punch has to be decreased accordingly. Such a decreased caulking outer diameter may decrease the area of caulking and so may degrade the caulking strength.

The positive-electrode connection electrode 67 of the lithium-ion secondary battery 1 in the present embodiment has the lower face 67b that is flat and is free from projections such as a rib and a protrusion. This enables a larger caulking outer diameter accordingly, and so can lead to higher caulking strength advantageously. When the positive-electrode connection electrode 67 is fixed to the battery cover 3 by caulking the forward end of the shaft part 61c of the positive-electrode terminal 61, the diameter of the caulking jig can be set without being affected by the size of the positive-electrode connection electrode 67 because the positive-electrode connection electrode 67 is flat.

Along with the caulking of the shaft part 61c, the protrusions 3b of the battery cover 3 also are caulked. The protrusions 3b thus caulked increase in diameter at the forward ends protruding from the fixing bores 65d of the second insulator 65, whereby the second insulator 65 is fixed to the battery cover 3. Such two types of caulking including the caulking of the shaft part 61c and the caulking of the protrusions 3b fix the second insulator 65 to the battery cover 3.

(2) Joining Between the Positive-Electrode Connection Electrode 67 and the Conductive Plate 68

The flange part 68b of the conductive plate 68 is allowed to abut with the lower face 67b of the positive-electrode connection electrode 67, followed by laser welding of mutual joining for hermetically sealing. The conductive plate 68 has a dome shape so as to detour the caulking part 61e of the positive terminal 61, and is configured to have a larger surface area of the conductive plate 68 in a less space. This allows, when the internal pressure of the battery container 2 rises, the conductive plate 68 to be easily deformed, and so enables reliable current interruption with lower pressure.

In the present embodiment, the lower face 67b of the positive-electrode connection electrode 67 to be joined with the conductive plate 68 has a rib 67c (see FIG. 4) along the circumference, into which the flange part 68b of the conductive plate 68 is to be fitted for fixing. The rib 67c is opposed to the outer end face of the flange part 68b at the radially outside position of the flange part 68b of the conductive plate 68 along the entire circumference. Then, the rib has a height so as to be flush with the flange part 68b. The boundary between the outer end face of the flange part 68b and the counter face of the rib 67c opposed thereto are joined by laser welding for hermetically sealing between the positive-electrode connection electrode 67 and the conductive plate 68. In this way, since the conductive plate 68 is fitted into the rib 67c for fixing, and so the positioning can be easily performed for laser welding. Since there is no difference in height at the welding part between the flange part 68b of the conductive plate 68 and the positive-electrode connection electrode 67, welding energy can be lowered, and so the quality of welding can be made stable for the laser welding at the boundary between the positive-electrode connection electrode 67 and the conductive plate 68.

(3) Joining Between the Positive Electrode Current-Collecting Plate 21, the Second Insulator 65 and the Conductive Plate 68

The positive electrode current-collecting plate 21 is provided with the supporting holes 22b at several positions of the base 22, and the second insulator 65 at the lower face has a flat part on the inside of the battery that is provided with the protrusions 65c at the positions corresponding to the supporting holes 22b to be inserted into the supporting holes 22b. The protrusions 65c are inserted into the supporting holes 22b and the forward ends of the protrusions 65c undergo thermal welding so as to be deformed by heating and be expanded in diameter, whereby the positive electrode current-collecting plate 21 is engaged with the second insulator 65, and is fixed by caulking in the state where the upper face of the base 22 abuts with the lower face of the second insulator 65.

Then, the joint part 24 of the positive electrode current-collecting plate 21 is joined with the center part 68c of the conductive plate 68. The joint part 24 of the positive electrode current-collecting plate 21 is joined with the center part 68c of the conductive plate 68 by welding. The welding between the joint part 24 of the positive electrode current-collecting plate 21 and the center part 68c of the conductive plate 68 may be performed by resistance welding, ultrasonic welding or friction stir welding, for example, as well as laser welding. The positive-electrode side terminal configuration unit 60 is manufactured through the processes of (1), (2) and (3) as stated above.

Since the positive electrode current-collecting plate 21 is fixed to the second insulator 65 via the protrusions 65c, and the second insulator 65 is engaged with the battery cover 3 via the protrusions 3b, vibrations and impacts externally applied to the positive electrode current-collecting plate 21, which are transmitted from the positive electrode current-collecting plate 21 to the second insulator 65, and then are transmitted from the second insulator 65 to the battery cover 3, can be distributed over the battery container 2 entirely, and in this way adverse effects on fragile parts such as the gasket 66, the fragile part 25, and the joint part 24 can be suppressed.

In the above-described example, the positive electrode current-collecting plate 21 and the second insulator 65 are fixed by thermally deforming the protrusions 65c for thermal welding because its processing step is easily performed. When firmer fixing is required, at least one of screws, rivets and adhesive may be used instead of thermal deformation or together with thermal deformation. Similarly, the above example describes the case where in order to fix the battery cover 3 and the second insulator 65, the second insulator 65 is engaged by inserting the protrusions 3b of the battery cover 3 into the fixing bores 65d of the second insulator 65 and pressurization-deforming the forward ends of the protrusions 3b, and the second insulator 65 may be fixed by using at least one of screws, rivets and adhesive instead of pressurization-deformation of the protrusions 3b at the forward ends or together with pressurization-deformation.

In the present embodiment, the positive electrode current-collecting plate 21, the conductive plate 68 and the positive-electrode connection electrode 67 are made of aluminum or aluminum alloy. In the configuration where the positive-electrode side of the lithium-ion secondary battery 1 is made of aluminum alloy and the negative-electrode side is made of copper alloy, the aluminum alloy is easily deformed than the copper alloy and so breakage also is easily on the side. Then the current interruption means is provided on the positive-electrode side in the present embodiment.

The lithium-ion secondary battery 1 is assembled by assembling the cover assembly including the positive-electrode side terminal configuration unit 60 manufactured by the above method, followed by joining the wound electrode group 40 to the positive electrode current-collecting plate 21 and the negative electrode current-collecting plate 31 to assemble the electrical-power generative elements assembly 50. Then, the wound electrode group 40 together with the positive electrode current-collecting plate 21 and the negative electrode current-collecting plate 31 is surrounded by an insulating sheet (not illustrated), which is then inserted into the battery case 4, and the opening 4a of the battery case 4 is closed by the battery cover 3, and the battery cover 3 is joined to the battery case 4 by lase welding for sealing. Then the battery container 2 is filled with electrolyte through the filling port 12, and the filling port 12 is closed by the plug 11, which is joined to the battery cover 3 by laser welding for sealing. The lithium-ion secondary battery 1 assembled by the above-stated assembly process enables charge/discharge with respect to an external electronic device connected via the positive-electrode terminal 61 and the positive-electrode terminal bolt 63, and the negative-electrode terminal 71 and the negative-electrode terminal bolt 73.

The lithium-ion secondary battery 1 has the following advantageous effects.

The lithium-ion secondary battery 1 of the present embodiment has the positive-electrode connection electrode 67 including a flat member, and the conductive plate 68 having the dome-shaped diaphragm part 68a, and is configured so that the flange part 68b of the conductive plate 68 abutting with the lower face 67b of the positive-electrode connection electrode 67 is welded, thus hermetically sealing between the positive-electrode connection electrode 67 and the conductive plate 68.

In this way, as compared with conventional cases, the shapes of the components of the positive-electrode connection electrode 67 and the conductive plate 68 as hermetically-sealing components can be simplified, and the welding property with the conductive plate 68 can be made stable because of the flatness of the lower face 67b of the positive-electrode connection electrode 67. Then, since the diaphragm part 68a of the conductive plate 68 has a dome shape, this can receive pressure at a wider area than a flat one when the internal pressure of the battery rises, and so can have stress easily so as to enable deformation of the conductive plate 68 in a limited space to break the fragile part 25. That is, the fragile part 25 can have relatively large rigidity for the same setting of the breakage pressure, which can prevent breakage of the fragile part 25 due to vibrations or impacts, and can interrupt the current path reliably and stably when the internal pressure rises.

The lithium-ion secondary battery 1 has a configuration such that the shaft part 61c of the positive-electrode terminal 61 penetrating through the battery cover 3 is caulked for electrical connection between the positive-electrode terminal 61 on the outside of the battery cover 3 and the positive electrode current-collecting plate 21 on the inside of the battery cover 3 and for integrally fixing of these positive-electrode terminal 61 and positive electrode current-collecting plate 21 with the battery cover 3. Then, in addition to the fixing by caulking with the shaft part 61c, the battery cover 3 is engaged with the second insulator 65 through the protrusions 3b, and the second insulator 65 is fixed to the positive electrode current-collecting plate 21 via the protrusions 65c.

With this configuration, vibrations and impacts externally applied to the positive electrode current-collecting plate 21 can be transmitted from the positive electrode current-collecting plate 21 to the second insulator 65, and then can be transmitted from the second insulator 65 to the battery cover 3, and so compared with the case of fixing by caulking with the shaft part 61c of the positive-electrode terminal 61 only, load applied on fragile parts such as the gasket 66 and the caulking part 61e can be suppressed, and so the hermetical-sealing property can be kept.

The second insulator 65 is fixed to the battery cover 3 on the outside of the battery and is fixed to the positive electrode current-collecting plate 21 on the inside of the battery, and such fixing on both sides of the inside and the outside of the battery of the second insulator 65 has a large advantageous effect of suppressing adverse effects from vibrations and impacts externally applied to the lithium-ion secondary battery 1 on the fragile part 25 as the current interruption means and the compressed part of the gasket 66 that keeps hermetical-sealing property via the current-collecting plate 21.

The current interruption means is inserted at the current path between the wound electrode group 40 and the positive-electrode terminal 61, and the fragile part of the current interruption means breaks in response to unexpected event such as overcharge, whereby safety can be kept greatly. If the fragile part or the part joined by welding break because of vibrations or impacts externally applied, such break may degrade hermetical-sealing property and may cause multi-function or quality deterioration.

According to the present embodiment, since the second insulator 65 is fixed on both sides of the outside and the inside of the battery, which can suppress vibrations or impacts applied to the fragile part 25 and the joint part 24 of the base 22, which then can suppress detaching of the joint part 24 or breakage of the fragile part 25 in an unexpected situation. Then, the lithium-ion secondary battery 1 obtained can include current interruption means with improved rigidity against vibrations and impacts.

In the present embodiment, the positive-electrode side terminal configuration unit 60 is provided with the current interruption means, and the negative-electrode side terminal configuration unit 70 may be provided with a current interruption means similarly.

Embodiment 2

Figure 7:
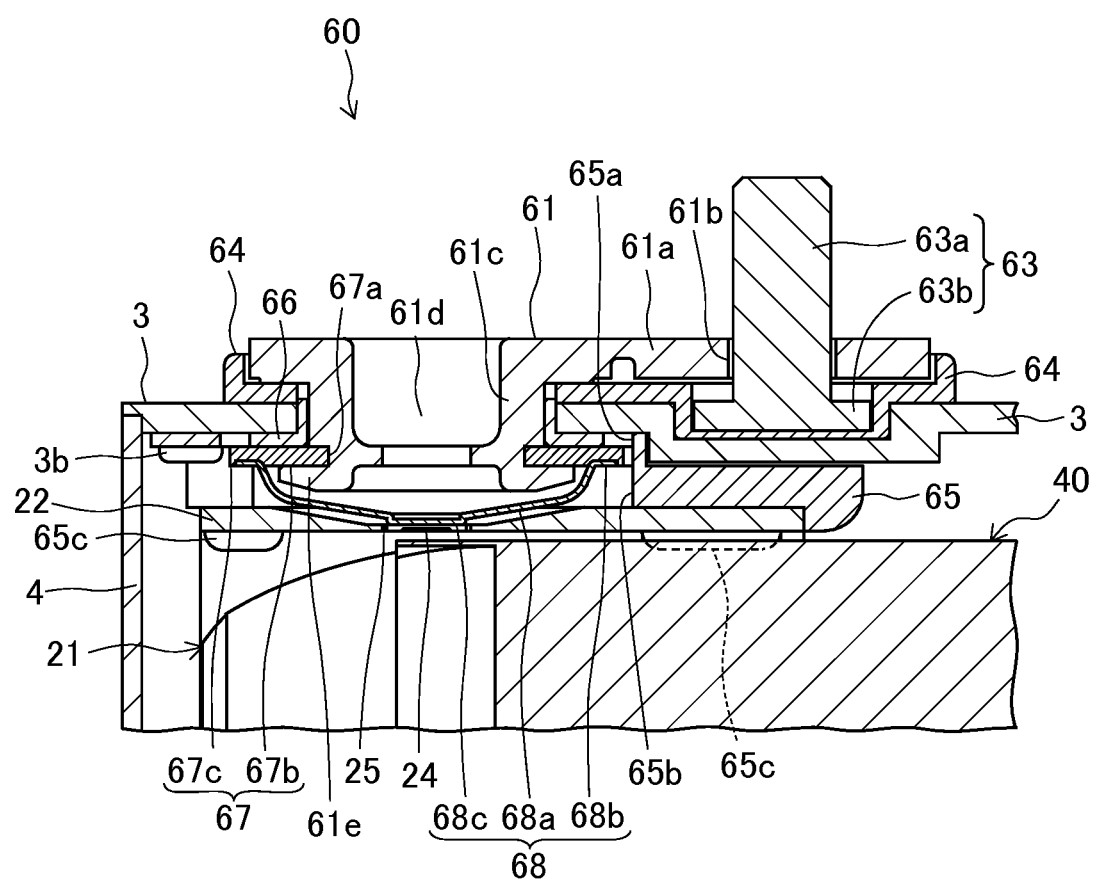
FIG. 7 is an enlarged cross-sectional view to illustrate the major part of a rectangular secondary battery according to Embodiment 2.

The following describes Embodiment 2 of the present invention, with reference to FIG. 7.

FIG. 7 is an enlarged cross-sectional view to illustrate the major part of a rectangular secondary battery according to Embodiment 2. The same reference numerals are assigned to elements similar to those of Embodiment 1, and their detailed descriptions are omitted.

The present embodiment has a feature in that engagement means of the second insulator 65 to the battery cover 3 includes direct fixing of the protrusions 3b to the battery inside of the battery cover 3 by caulking only, and fixing by caulking of the shaft part 61c of the positive terminal 61 is disconnected.

In Embodiment 1, the means of fixing the second insulator 65 to the battery cover 3 includes the combination of the caulking of the shaft part 61c of the positive terminal 61 and the direct fixing of the protrusions 3b to the battery inside of the battery cover 3 for rigid fixing, thereby suppressing transmission of vibrations and impacts from the current-collecting plate 21.

In the present embodiment, the second insulator 65 is not fixed by caulking with the shaft part 61c of the positive terminal 61, but is fixed through the caulking of the protrusions 3b of the battery cover 3 on the outside of the battery, and the positive terminal 61 is fixed by caulking of the protrusions 65c on the inside of the battery. The second insulator 65 is not inserted between the caulking part 61e of the positive terminal 61 and the battery cover 3, and the positive-electrode connection electrode 67 and the gasket 66 only are inserted.

With this configuration, vibrations and impacts of the positive current-collecting plate 21 are not transmitted to the caulking part 61e of the positive terminal 61, and so do not adversely affect the hermetically sealing with the gasket 66. The lithium-ion secondary battery 1 obtained so can have current interruption means with improved rigidity against vibrations and impacts.

Especially in the configuration where the gasket 66 is caulked on the battery inside of the battery cover 3, the gasket 66 may be made of a resin having relatively soft properties, such as tetrafluoroethylene perfluoroalkylvinylether copolymer (PFA) or a resin slightly having elasticity, containing elastomer in polyphenylene sulfide (PPS), polybutylene terephthalate (PBT) or the like, because such a resin can keep hermetical-sealing property. On the other hand, the second insulator to fix the current-collecting plate may be made a resin having high rigidity, which may be PPS, PBT or the like that does not contain elastomer, especially polypropylene (PP) containing glass fiber or the like is suitable. Then, to configure the gasket 66 and the second insulator 65 as an integrated piece is not always suitable, considering their component properties.

In such a case, the gasket 66 may be integrated with the caulking part 61e of the positive terminal 61 to function as hermetical-sealing and insulating from the battery cover 3, and then the second insulator 65 may be disconnected from the caulking of the positive terminal 61, whereby more suitable resins can be selected.

Embodiment 3

Figure 8:
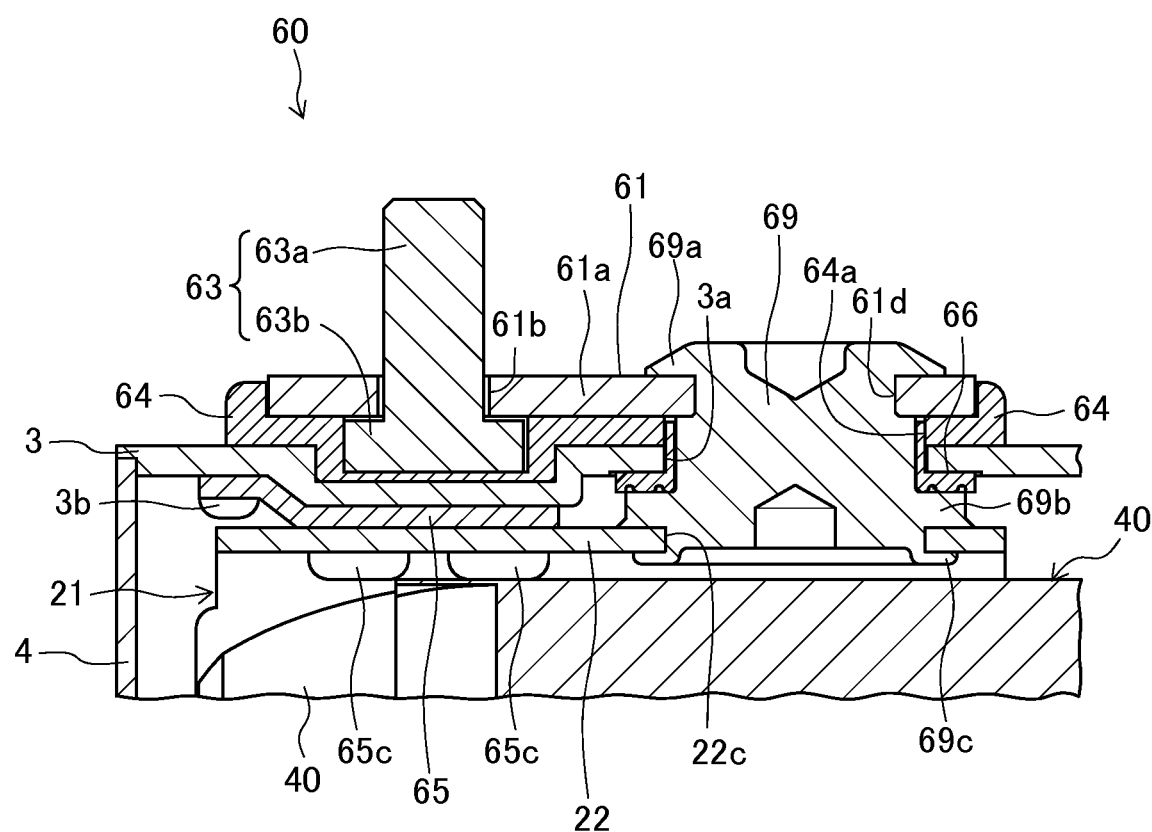
FIG. 8 is an enlarged cross-sectional view to illustrate the major part of a rectangular secondary battery according to Embodiment 3.

The following describes Embodiment 3 of the present invention, with reference to FIG. 8.

FIG. 8 is an enlarged cross-sectional view to illustrate the major part of a rectangular secondary battery according to Embodiment 3. The same reference numerals are assigned to elements similar to those of the aforementioned embodiments, and their detailed descriptions are omitted.

The present embodiment describes the configuration where the positive-electrode side terminal configuration unit 60 does not have the current interruption means.

The positive terminal 61 includes the flat part 61a and a shaft part 69 (electrode terminal part) configured as separate members. The flat part (external terminal) 61a has an upper face, with which a bus bar (not illustrated) comes into contact, and a bus-bar connecting terminal (not illustrated) is fixed to the terminal bolt 63. The flat part 61a has an opening 61d that communicates with the opening 3a of the battery cover 3, into which the shaft part (connecting shaft) 69 is to be inserted.

The shaft part 69 is made of aluminum alloy, for example, which is the same material as that of the flat part 61a, and is inserted into the opening 3a of the battery cover 3 so as to penetrate through the battery cover 3, so that one end thereof is disposed on the outside of the battery cover 3 and the other end is disposed on the inside of the battery cover 3.

The shaft part 69 has a first caulking part 69a having an upper end part being caulked and a second caulking part 69b having an intermediate part in the axial direction being caulked so as to be opposed to the lower face of the battery cover 3, and the first caulking part 69a and the second caulking part 69b fix the flat part 61a, the first insulator 64 and the gasket 66 to the battery cover 3 integrally. The gasket 66 is inserted between the battery cover 3 and the shaft part 69 for insulating and sealing therebetween. The lower end part of the shaft part 69 is inserted into the opening 22c bored at the base 22 of the positive current-collecting plate 21 for caulking, and the second caulking part 69b and a third caulking part 69c electrically connect and integrally fix the positive current-collecting plate 21.

The battery cover 3 is insulated from the flat part 61a by the first insulator 64 on the outside of the battery, and is electrically insulated from the shaft part 69 and the positive current-collecting plate 21 by the gasket 66 and the second insulator 65 on the inside of the battery.

The second insulator 65 is inserted between the lower face of the battery cover 3 and the base 22 of the positive current-collecting plate 21. The lower face of the battery cover 3 has a plurality of protrusions 3b formed beforehand, and the second insulator 65 has a plurality of through holes (not illustrated) at the positions corresponding to the protrusions 3b of the battery cover 3. The forward ends of the protrusions 3b protruding from the through holes are deformed under pressure to be expanded in diameter for caulking, whereby the second insulator 65 is engaged with the battery cover 3.

The second insulator 65 is provided with a plurality of protrusions 65c at the lower face, and the plurality of protrusions 65c are inserted into a plurality of supporting holes (not illustrated) provided at the base 22 of the positive electrode current-collecting plate 21 at the positions opposed to the protrusions 65c. Then the forward ends of the protrusions 65c are deformed by heating to be expanded in diameter for caulking, thus engaging the positive electrode current-collecting plate 21 with the second insulator 65. When the forward ends of the protrusions 65c are deformed by heating, the positive electrode current-collecting plate 21 also is heated for thermal welding of the base 22 to the second insulator 65.

The positive current-collecting plate 21 fixed by caulking at the shaft part 69 only may cause vibrations and impacts at the positive current-collecting plate 21 to be directly transmitted to the shaft part 69, which may adversely affect the gasket 66 adjacent thereto as well, and so degrade the hermetical-sealing property. In the present embodiment, the positive current-collecting plate 21, the second insulator 65 and the battery cover 3 are firmly fixed, whereby vibrations and impacts applied to the positive current-collecting plate 21 from external pressure can be suppressed, meaning that they are less transmitted to the shaft part 69, and so resistance to impacts and vibrations can be achieved.

That is the description for the case where the second insulator 65 is fixed to the battery cover 3 by inserting the protrusions 3b of the battery cover 3 into the through holes of the second insulator 65 and then caulking the forward ends of the protrusions. The second insulator 65 may be insert-molded at the battery cover 3 beforehand.

That is a detailed description of the embodiments of the present invention. However, the present invention is not limited to the above-stated embodiments, and the design may be modified variously without departing from the spirits of the present invention defined in the attached claims. For instance, the entire detailed configuration of the embodiments described above for explanatory convenience is not always necessary for the present invention. A part of one embodiment may be replaced with the configuration of another embodiment, or the configuration of one embodiment may be added to the configuration of another embodiment. The configuration of each embodiment may additionally include another configuration, or a part of the configuration may be deleted or replaced.

REFERENCE SIGNS LIST

1 Rectangular secondary battery
2 Battery container
3 Battery cover
3b Battery cover side fixing part (engagement part)
4 Battery case
11 Plug
13 Safety valve
21 Positive electrode current-collecting plate
31 Negative electrode current-collecting plate
40 Wound electrode group
61 Positive-electrode terminal
63 Positive-electrode terminal bolt
64 First insulator
65 Second insulator
66 Gasket
67 Positive-electrode connection electrode
68 Conductor

The invention claimed is:

1. A rectangular secondary battery, comprising:
a flat-shaped electrode group;
a current-collecting plate electrically connected to the electrode group;
a battery case accommodating the current-collecting plate and the electrode group;
a battery cover that closes an opening of the battery case;
an electrode terminal disposed along a lower face of the battery cover;
a first insulator that is disposed between the electrode terminal and an upper face of the battery cover;
a second insulator that is disposed between the current-collecting plate and the lower face of the battery cover, wherein the battery cover includes a battery cover side fixing part that engages with the second insulator and fixes the second insulator to the battery cover, and the second insulator includes a current-collecting plate side fixing part that fixes the current-collecting plate;
a current interruption assembly that interrupts electrical connection between the electrode terminal and the current-collecting plate, wherein the current interruption assembly includes:
a connection electrode electrically connected to the electrode terminal,
a conductive plate that includes a dome-shaped diaphragm part having a diameter that gradually increases along an axial direction from a center part to a ring-shaped flange part that is joined with the connection electrode, wherein the dome-shaped diaphragm part includes a first inclined-face part adjacent to the ring-shaped flange part that has an inclination angle that is smaller than 45° with reference of the axial direction of the dome-shaped diaphragm part, and
a fragile part that interrupts the electrical connection between the electrode terminal and the current-collecting plate when an internal pressure of the battery deforms the conductive plate by exceeding a pressure threshold; and
a gasket that is inserted between the electrode terminal and the battery cover for insulating and sealing;
wherein the battery cover is mechanically coupled, via caulk, to the second insulator by at least one first protrusion that protrudes from the battery cover side fixing part into a fixing hole bored at a face of the second insulator in a direction that is orthogonal to the axial direction,
wherein the at least one first protrusion protrudes from a first side of the second insulator through the second insulator and extends past a second side of the second insulator,
wherein the second insulator is coupled to the current-collecting plate via at least one second protrusion, and
wherein the at least one second protrusion is inserted via a through-hole in a base of the current-collecting plate.

2. The rectangular secondary battery according to claim 1, wherein connection electrode is fixed to the battery cover by caulking the electrode terminal.

3. The rectangular secondary battery according to claim 2, wherein the electrode terminal is configured so that the second insulator is inserted between the connection electrode and the battery cover, and the connection electrode and the second insulator are integrally fixed to the battery cover.

4. The rectangular secondary battery according to claim 2, wherein the electrode terminal is configured so that the gasket is inserted between the connection electrode and the battery cover, and the connection electrode and the gasket are integrally fixed to the battery cover.

5. The rectangular secondary batter according to claim 1, wherein the dome-shaped diaphragm part further includes a second inclined-face part adjacent to the first inclined-face part, wherein the second inclined-face part has an inclination angle that is larger than 180° with reference to the first inclined-face part.

6. The rectangular secondary battery according to claim 5, wherein as the internal pressure, the diaphragm part is deformed so that the first inclined-face part moves in a direction of increasing the diameter and the second inclined-face part moves to lower a height of the center part.

* * * * *